(12) United States Patent
Knoop

(10) Patent No.: US 10,221,904 B2
(45) Date of Patent: Mar. 5, 2019

(54) ROTATIONAL FIXING FOR A GUIDE PIN OF A DISC BRAKE AND METHOD THEREOF

(71) Applicant: Meritor Heavy Vehicle Braking Systems (UK) Limited, Cwmbran, Gwent (GB)

(72) Inventor: Dietmar Knoop, Gwent (GB)

(73) Assignee: Meritor Heavy Vehicle Braking Systems (UK) Limited, Cwmbran, Gwent (GB)

( * ) Notice: Subject to any disclaimer, the term of this patent is extended or adjusted under 35 U.S.C. 154(b) by 0 days.

(21) Appl. No.: 15/174,080

(22) Filed: Jun. 6, 2016

(65) Prior Publication Data

US 2016/0356325 A1 Dec. 8, 2016

(30) Foreign Application Priority Data

Jun. 4, 2015 (EP) .................................... 15170690

(51) Int. Cl.
| | | |
|---|---|---|
| *F16D 55/2265* | (2006.01) | |
| *F16D 65/00* | (2006.01) | |
| *F16D 55/227* | (2006.01) | |
| *F16D 55/00* | (2006.01) | |

(52) U.S. Cl.
CPC ..... *F16D 55/22655* (2013.01); *F16D 55/227* (2013.01); *F16D 65/0087* (2013.01); *F16D 2055/007* (2013.01); *F16D 2250/0084* (2013.01)

(58) Field of Classification Search
CPC ............. F16D 55/227; F16D 55/22655; F16D 2055/007; F16D 65/0087
USPC ....................... 188/73.44, 73.45; 72/352, 356
See application file for complete search history.

(56) References Cited

U.S. PATENT DOCUMENTS

| | | | | |
|---|---|---|---|---|
| 2,527,871 A | * | 10/1950 | Bakewell | ................ B23B 29/10 |
| | | | | 188/68 |
| 3,213,658 A | * | 10/1965 | Brown | ................... B21D 51/08 |
| | | | | 72/352 |
| 3,805,925 A | * | 4/1974 | Schoenhenz | ...... F16D 55/22655 |
| | | | | 188/73.45 |

(Continued)

FOREIGN PATENT DOCUMENTS

| | | |
|---|---|---|
| DE | 10311896 A1 | 9/2004 |
| EP | 0028955 A1 | 5/1981 |

(Continued)

OTHER PUBLICATIONS

European Patent Office, Extended European Search Report for the corresponding European Patent Application No. 16173201.1 dated Feb. 17, 2017.

(Continued)

*Primary Examiner* — Thomas J Williams
(74) *Attorney, Agent, or Firm* — Brooks Kushman P.C.

(57) ABSTRACT

A rotational fixing for a guide pin of a disc brake and method for fixing a guide pin of a disc brake. The rotational fixing includes a guide sleeve having a sleeve portion, a receiving portion of a brake carrier, and an inter-connection. The receiving portion receives the sleeve portion. The inter-connection engages the sleeve portion and the receiving portion and restricts rotation of the guide sleeve relative to the brake carrier when the sleeve portion is received by the receiving portion.

20 Claims, 10 Drawing Sheets

(56) References Cited

U.S. PATENT DOCUMENTS

| | | | | |
|---|---|---|---|---|
| 4,244,451 A | * | 1/1981 | Johannesen | F16D 55/2262 |
| | | | | 188/73.45 |
| 4,372,428 A | * | 2/1983 | Delaunay | F16D 55/22655 |
| | | | | 188/73.34 |
| 4,393,963 A | * | 7/1983 | Oltmanns, Jr. | F16D 55/2262 |
| | | | | 188/73.35 |
| 4,596,316 A | * | 6/1986 | Crossman | F16D 57/002 |
| | | | | 188/158 |
| 4,653,614 A | | 3/1987 | Price et al. | |
| 4,762,206 A | * | 8/1988 | Arimitsu | F16D 55/22655 |
| | | | | 188/73.31 |
| 4,830,149 A | | 5/1989 | Giering | |
| 5,439,084 A | * | 8/1995 | Vila Boluda | F16B 33/002 |
| | | | | 188/73.44 |
| 5,526,904 A | | 6/1996 | Walden et al. | |
| 5,593,006 A | * | 1/1997 | Le Deit | F16D 55/22655 |
| | | | | 188/73.37 |
| 8,051,958 B1 | | 11/2011 | Rockwell et al. | |
| 2004/0173420 A1 | | 9/2004 | Macke et al. | |
| 2007/0029147 A1 | | 2/2007 | Macke et al. | |
| 2009/0198366 A1 | | 8/2009 | Schneider | |
| 2013/0126284 A1 | | 5/2013 | Reiser | |
| 2014/0116817 A1 | | 5/2014 | Morais et al. | |

FOREIGN PATENT DOCUMENTS

| | | | |
|---|---|---|---|
| EP | 0035946 A1 | | 9/1981 |
| FR | 2905155 A1 | | 2/2008 |
| JP | 04008927 A | * | 1/1992 |
| WO | 9401693 A1 | | 1/1994 |
| WO | 2009059762 A1 | | 5/2009 |
| WO | 2010054918 A1 | | 5/2010 |
| WO | 2014071001 A1 | | 5/2014 |

OTHER PUBLICATIONS

European Patent Office, Extended European Search Report for the corresponding European Patent Application No. 15170690.0 dated Dec. 8, 2015.

European Patent Office, Extended European Search Report for related Application No. EP 18184472.1, dated Oct. 24, 2018.

* cited by examiner

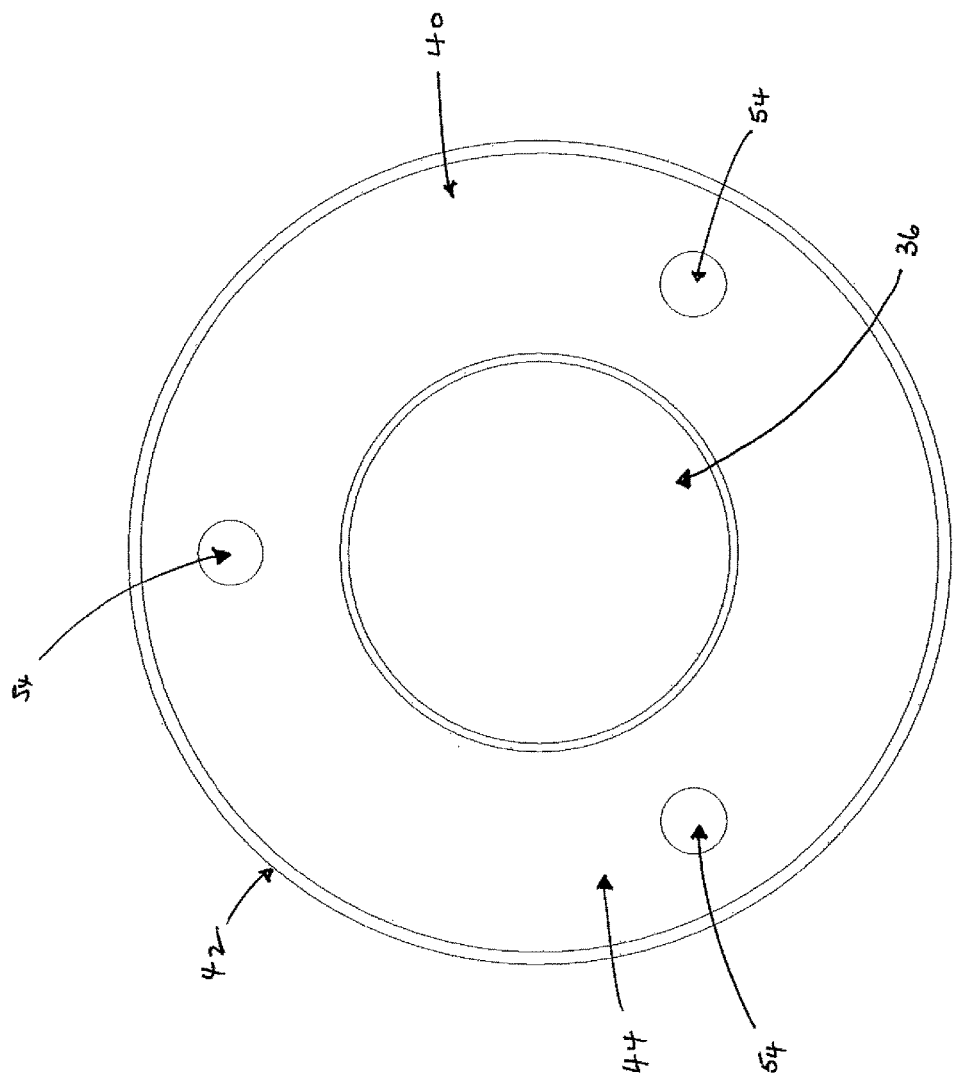

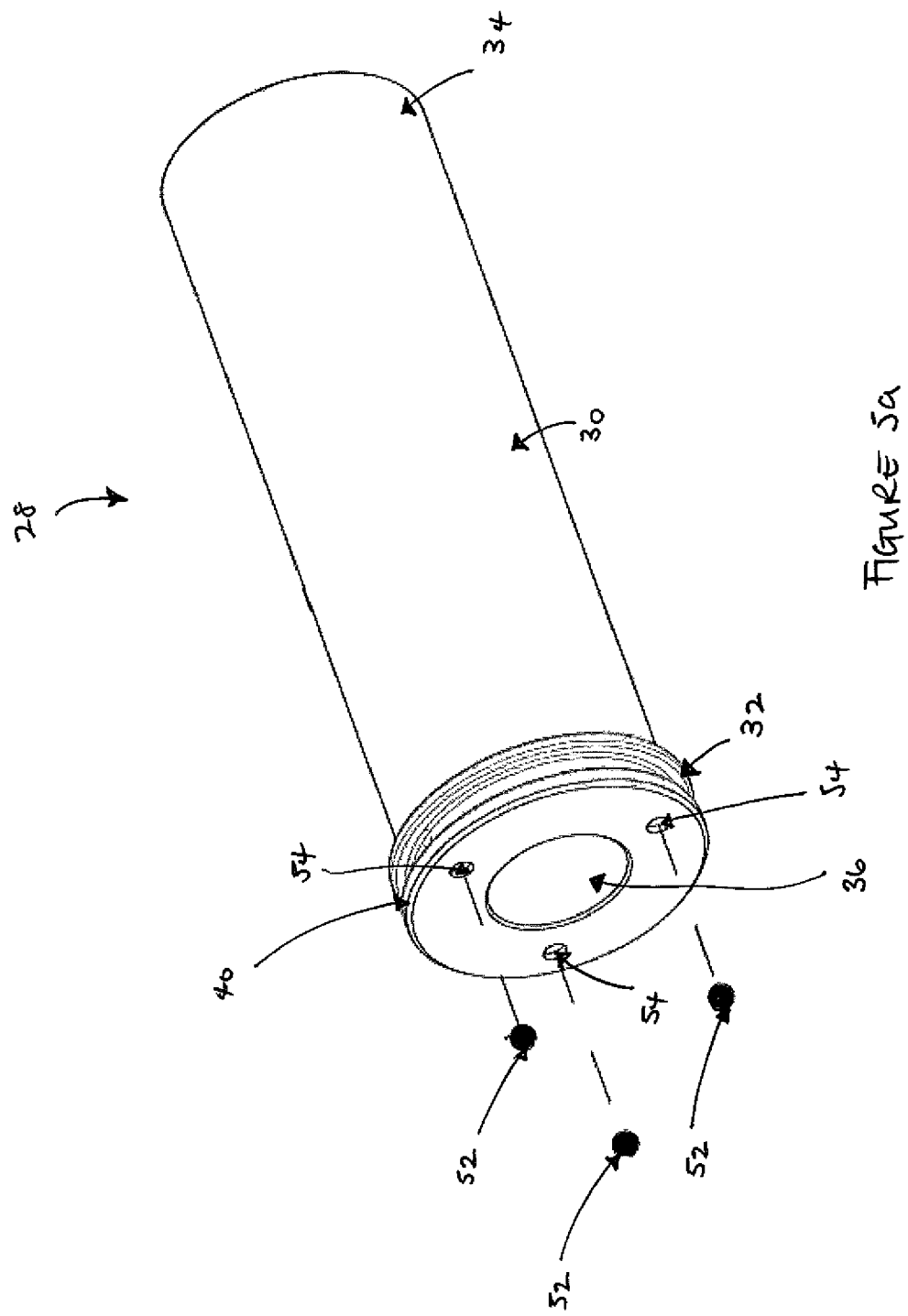

ROTATIONAL FIXING FOR A GUIDE PIN OF A DISC BRAKE AND METHOD THEREOF

TECHNICAL FIELD

The present invention relates to a disc brake. In particular, the present invention relates to a rotational fixing for a guide pin of a disc brake and a method of fixing a guide pin of a disc brake.

BACKGROUND

Disc brakes are commonly used for braking heavy vehicles such as trucks, buses and coaches.

Disc brakes conventionally comprise a brake carrier, a caliper and a rotor. The carrier is arranged to carry brake pads on each side of the rotor. The caliper is slidably mounted on the brake carrier by two or more guide assemblies, such that when the disc brake is actuated, the caliper is able to slide with respect to the brake carrier. As the caliper slides inboard, the brake pads are urged onto the opposing faces of the rotor in a clamping action and a braking action is effected.

A guide assembly typically comprises a guide pin along which the caliper can slide and a bore disposed in the caliper for receiving the guide pin. Typically each guide pin comprises a smooth outer guide sleeve along which the caliper slides and a guide bolt which extends through the guide sleeve and is screwed into a bore of the brake carrier to retain the guide sleeve.

This arrangement has been proven over many years of usage. However, it has been recognized that in certain testing conditions, specifically when a vehicle undergoes a significant number of forward and reverse movements, there is a risk that the guide bolt of the disc brake may rotate and loosen.

Previous attempts to solve this problem have utilized lock patches to inhibit rotation of the guide bolt.

However, the present inventors have recognized that this approach in effect deals with a symptom of the problem rather than the cause. The present inventors have also identified that the cause of the loosening bolt problem is the rotation of the guide sleeve and the rotation of the guide sleeve being frictionally transmitted into rotation of the bolt.

The present invention seeks to overcome or at least mitigate the problems of the prior art.

SUMMARY

A first aspect of the invention provides a rotational fixing for a guide pin of a disc brake. The fixing restricts movement of the guide pin relative to the brake carrier by inter-locking the guide sleeve of the guide pin and the brake carrier.

The rotational fixing for a guide pin of a disc brake may comprise: a sleeve portion of a guide sleeve; a receiving portion of a brake carrier to receive the sleeve portion; and an inter-connection to engage the sleeve portion and receiving portion so as to restrict rotation of the guide sleeve relative to the brake carrier, when the sleeve portion is received by the receiving portion.

By engaging the sleeve portion and receiving portion, the rotational fixing is able to substantially inhibit, rotational movement of the guide sleeve relative to the brake carrier in a clockwise direction and/or anti-clockwise direction. Thus, the rotational fixing is able to substantially avoid, undesirable rotational movement of the guide sleeve relative to the brake carrier caused by a changing torque acting on the disc brake as a vehicle moves repeatedly forwardly and backwardly. The transmission of rotation from the guide sleeve to the guide bolt of the guide pin and consequential loosening of the guide bolt is thereby substantially averted.

Preferably, the inter-connection is also configured to engage the sleeve portion and receiving portion so as to restrict translation of the guide sleeve relative to the brake carrier, when the sleeve portion is received by the receiving portion. As a result, the rotational fixing is able to substantially impede lateral translational movement of the guide sleeve relative to the brake carrier in the circumferential direction X and perpendicular translational movement of the guide sleeve relative to the brake carrier in the tangential direction Y. Thus, the rotational fixing is able to forestall any undesirable movement (rotational and translational) of guide sleeve relative to the brake carrier caused by dynamic loads acting on the disc brake.

The sleeve portion of the guide sleeve may be a first end portion of the guide sleeve or a rim at the first end of the guide sleeve. The sleeve portion may alternatively comprise a flange arranged at the first end of the guide sleeve comprising an outer edge and a flange face.

The receiving portion is configured to receive the sleeve portion such that, when received, the guide sleeve extends from the brake carrier in an axial direction A. The receiving portion of the brake carrier may comprise a receiving face against which the sleeve portion is located when the sleeve portion is received by the receiving portion and which defines the region where the guide sleeve is mounted on the brake carrier. The receiving portion may be deformable during the assembly of the rotational fixing. The receiving face may be a surface region of an inboard surface of the brake carrier, wherein the receiving face is substantially flush with the inboard surface of the brake carrier. Alternatively, to enhance the fixing action, the receiving portion may comprise a recess formed in the brake carrier in which the sleeve portion can be fitted so as to further restrict translational movement between the guide sleeve and the brake carrier, and the receiving face is disposed in the recess.

The inter-connection may comprise a connector that is locatable between the sleeve portion and receiving portion to form an engagement. The connector may be locatable to extend in the axial direction A between the sleeve portion and receiving portion. Alternatively, the connector may be locatable to extend in a radial direction between the sleeve portion and the receiving portion, perpendicular to the axial direction A in which the guide sleeve is mounted on the brake carrier.

The inter-connection may comprise a first cavity formed in the sleeve portion to receive a first part of the connector and a second cavity formed in the receiving portion to receive a second part of the connector, wherein the connector is co-locatable in the first cavity and the second cavity so as to engage the guide sleeve and brake carrier when the sleeve portion is received by the receiving portion. The first cavity may be formed in the flange face. The second cavity may be formed in the receiving face.

The first cavity and first part of the connector are preferably configured to form an interference or press-fit connection. Likewise, the second cavity and second part of the connector is preferably configured to form an interference or press-fit connection.

The first cavity may be a pre-formed first cavity in the sleeve portion, formed prior to receiving the first part of the connector. The second cavity may be a pre-formed second cavity in the receiving portion, formed prior to receiving the second part of the connector. If the receiving portion is deformable, the pre-formed second cavity may be a deformable as the second part of the connector is received in the pre-formed second cavity so as to enhance the interference or press-fit connection and minimize tolerances. Alternatively, to create a press-fit connection and minimize tolerances, the second cavity may be a formable second cavity in the receiving portion, formed when the sleeve portion is received in the receiving portion and the connector is pushed against the deformable receiving portion to form a cavity in which the second part of the connector is received.

The connector may comprise a cylinder, cuboid, sphere, ovoid, ellipsoid or any other suitably shaped body. In an embodiment, the connector may be a ball-like connector with a substantially spherical body, the first cavity may be a first semi-circular cavity configured to receive a first sector of the ball, the second cavity may be a second semi-circular cavity configured to receive a second sector of the ball, wherein the ball is co-locatable in the first cavity and the second cavity to engage the guide sleeve and brake carrier when the sleeve portion is received by the receiving portion. The ball connector may be a ball bearing. In an alternative embodiment, the connector may be a pin-like connector with an elongate body, the first cavity may be configured to receive the first end of the pin, the second cavity may be configured to receive the second end of the pin and the pin is co-locatable in the first cavity and the second cavity so as to engage the guide sleeve and brake carrier when the sleeve portion is received by the receiving portion.

Alternatively, the inter-connection may comprise a protrusion and indent to receive the protrusion. The protrusion may be configured to extend from the sleeve portion or the receiving portion. For example, the protrusion may be a blade or tooth extending outwardly from the sleeve portion or receiving portion. The indent may be formed in the corresponding portion to receive the protrusion and thereby engage the guide sleeve and the brake carrier, when the sleeve portion is received by the receiving portion. The indent may be a pre-formed indent, formed in a portion prior to the sleeve portion being received by the recessing portion and the protrusion being received in the indent. Alternatively, if the protrusion is formed in the sleeve portion and the receiving portion is deformable, the indent may be a formable indent in the receiving portion, formed when the sleeve portion is received by the receiving portion and the protrusion is pushed against the deformable receiving portion.

The protrusion may be configured to extend in an axial direction A or radial direction between the sleeve portion and receiving portion into the indent.

A second aspect of the invention relates to a disc brake comprising: a brake carrier; a caliper; at least one guide pin comprising a guide sleeve; and a rotational fixing according to the first aspect of the invention.

To mount the guide pin on the brake carrier, the guide pin may comprise a guide bolt and the disc brake may further comprise a bore formed in the brake carrier to receive the guide fastener. Preferably, the guide bolt is configured to extend through the sleeve and the bore is arranged in the receiving portion. The bore may be arranged centrally or eccentrically in the receiving portion. The guide bolt may, for example, be a threaded bolt and the bore disposed in the brake carrier may have a complimentary threaded bore.

The disc brake may comprise one or more rotational fixings to restrict the movement of the guide pin. The disc brake may comprise a plurality of the same type of rotational fixings. Alternatively, the disc brake may comprise a variety of different types of rotational fixings.

The rotational fixing not only helps to restrict rotation, and optionally translation, of the guide sleeve relative to the brake carrier but also advantageously helps to minimize operator error when installing or servicing the disc brake. For example, if the operator fails to correctly align and inter-engage the sleeve portion and the receiving portion, but nevertheless tightens the fastener, the guide pin will not extend in an axial direction A to the brake carrier as required. Thus, the operator will not be able to assemble the caliper because the guide pin will be out of alignment to the complimentary bore of the caliper.

A third aspect of the invention relates to a method for fixing a guide pin of a disc brake comprising: providing a sleeve portion of a guide sleeve, the sleeve portion having a first cavity; providing a receiving portion of a brake carrier, the receiving portion having a second cavity; co-locating a connector in the first cavity and the second cavity to engage the sleeve portion and receiving portion so as restrict rotation of the guide sleeve relative to the brake carrier, and optionally to restrict translation of the guide sleeve relative to the brake carrier.

If the second cavity is a pre-formed cavity in the receiving portion, the step of co-locating the connector may comprise: locating a first part of the connector in the first cavity; and positioning the sleeve portion with the connector located in the first cavity in the receiving portion; and aligning the first cavity and the second cavity to locate the second part of the connector in the second cavity.

If the receiving portion is deformable, the step of co-locating may comprise: locating a first part of the connector in the first cavity; and positioning the sleeve portion with the connector located in the first cavity in the receiving portion; and pushing the connector against the deformable receiving portion to form the second cavity in which the second part of the connector is received.

BRIEF DESCRIPTION OF THE DRAWINGS

For a better understanding of the present invention and to show how it may be carried into effect, reference will now be made, by way of example only, to the accompanying drawings, in which:

FIGS. 3a and 3b are different views showing the sleeve portion of the embodiment of the rotational fixing;

FIGS. 5a, 5b and 5c are different views showing how ball bearing connectors may be fitted into cavities on the sleeve portion in the embodiment of the rotational fixing;

DETAILED DESCRIPTION

Figure 1:
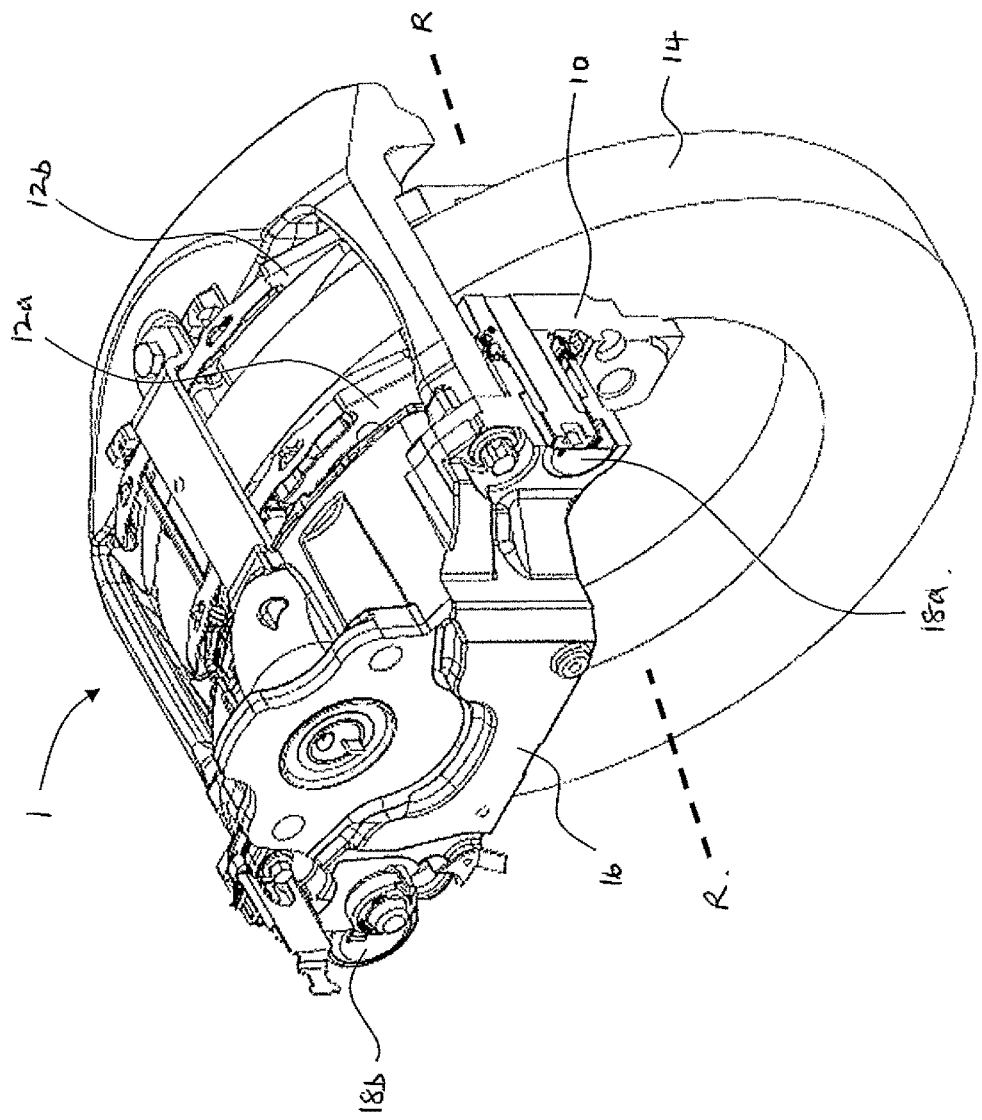
FIG. 1 is an isometric view showing a disc brake according to the present invention with an embodiment of a rotational fixing for a guide pin.
Figure 1:
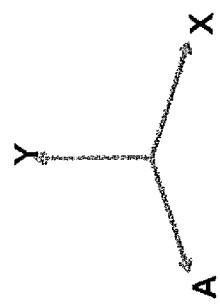
Figure 2:
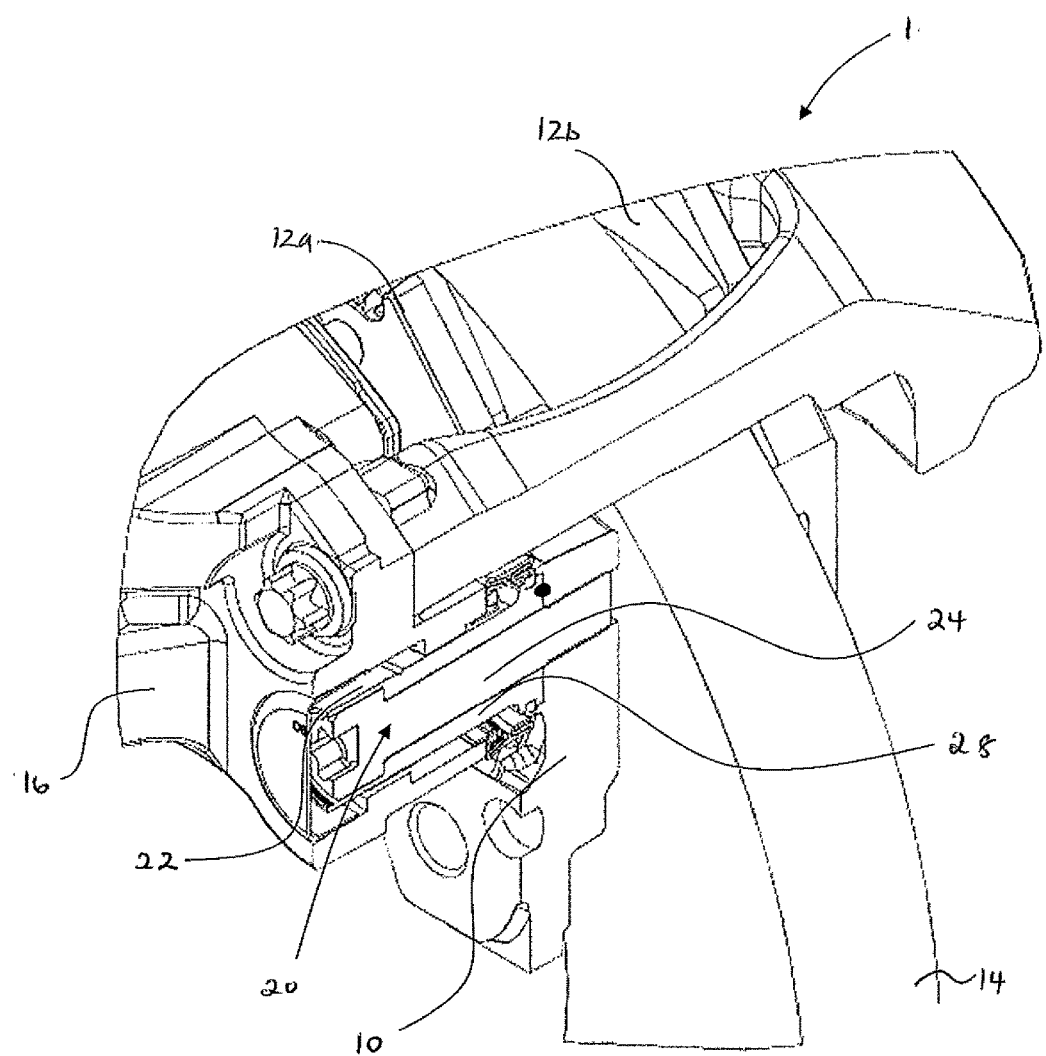
FIG. 2 is an enlarged isometric cross-sectional view showing the guide pin of the disc brake according to the present invention.
Figure 2:
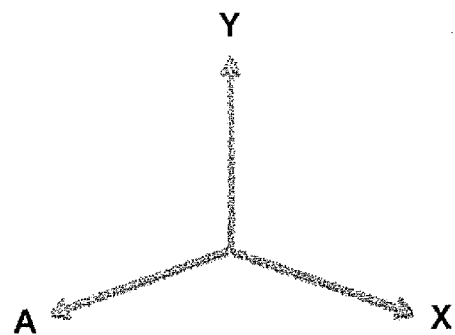
Figure 3A:
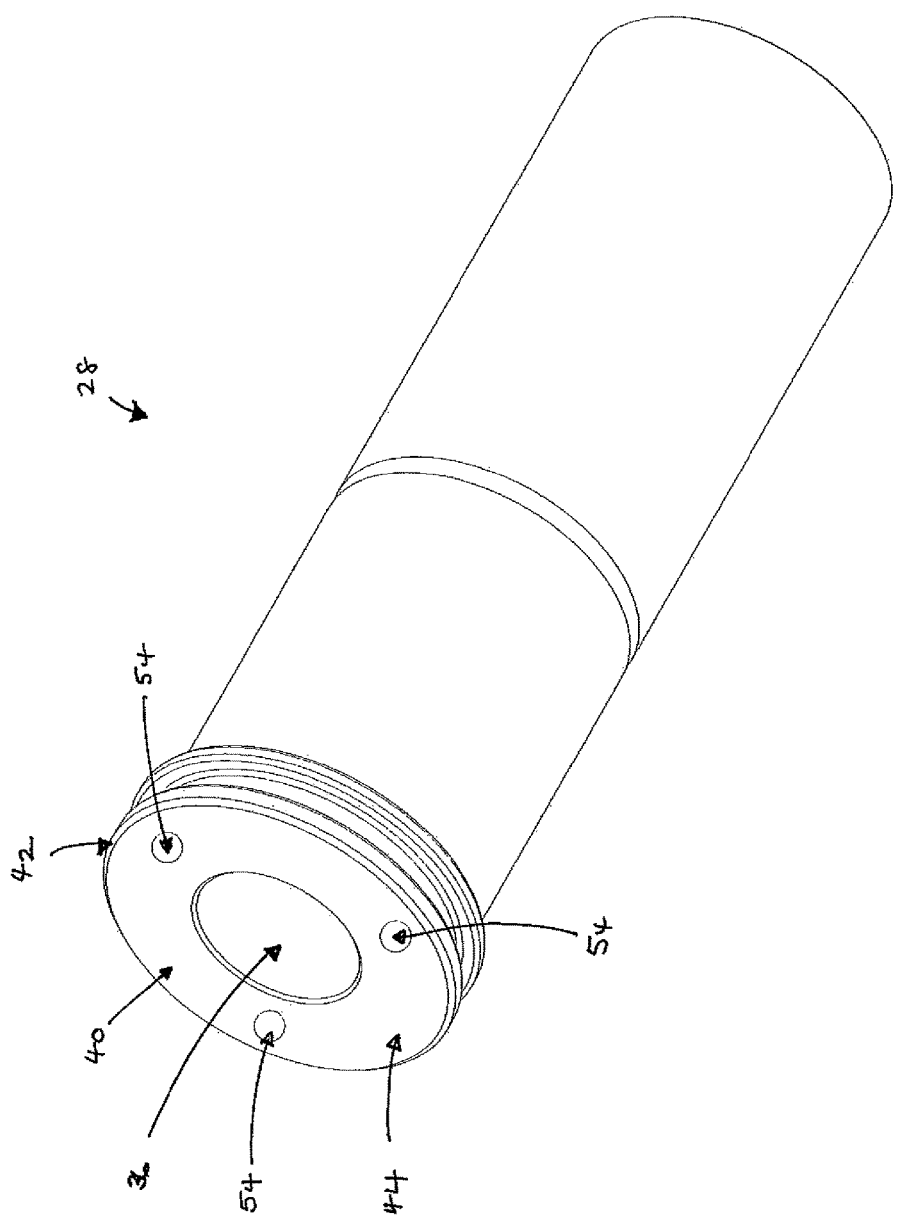
Figure 4:
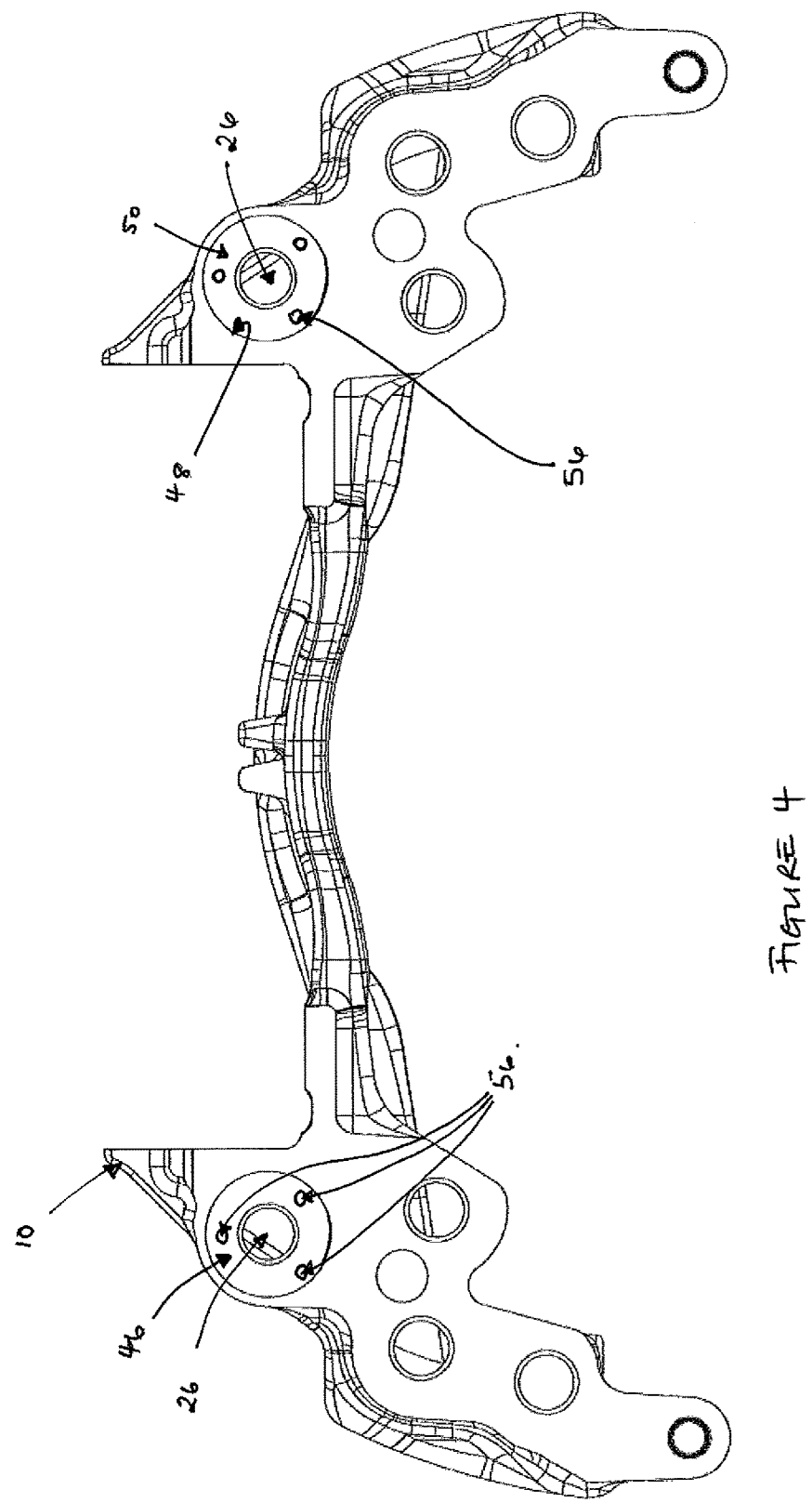
FIG. 4 is a front view of the brake carrier showing the recess of the embodiment of the rotational fixing.
Figure 5B:
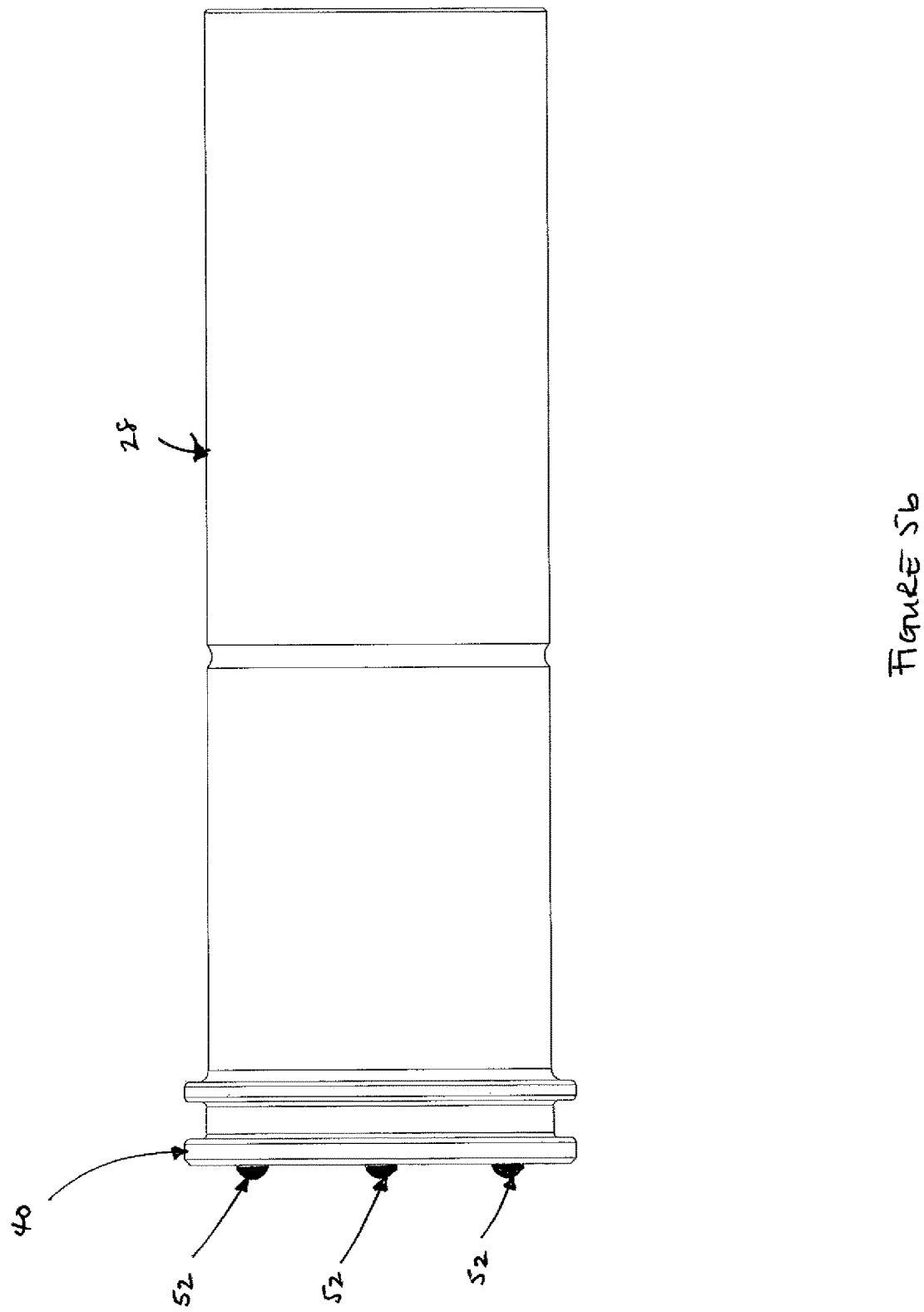
Figure 5C:
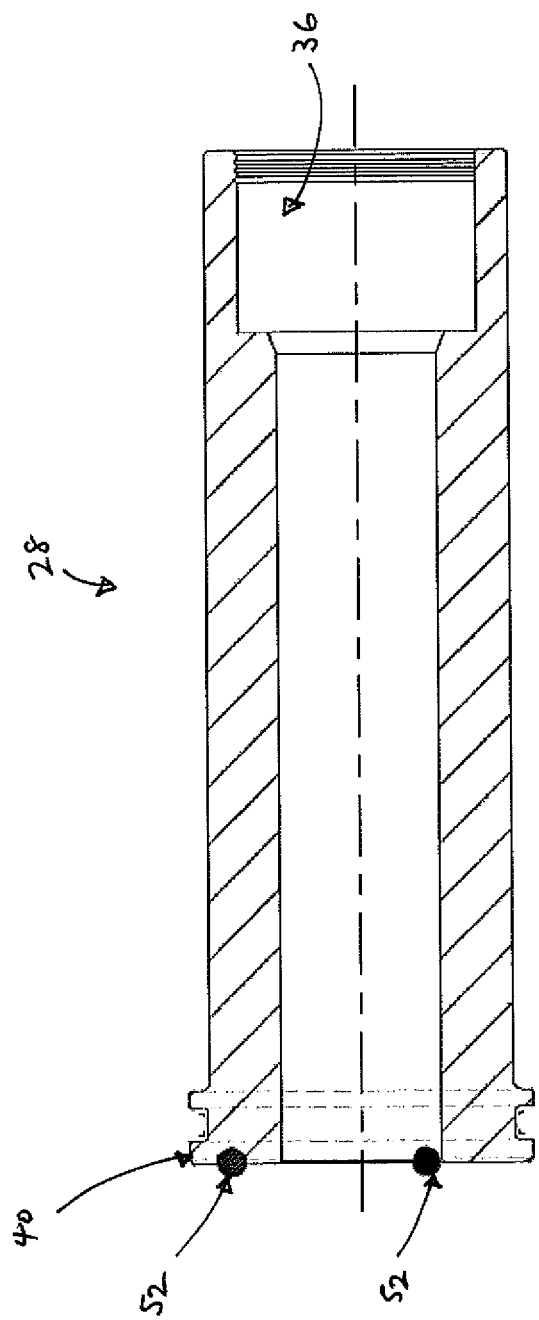
Figure 6:
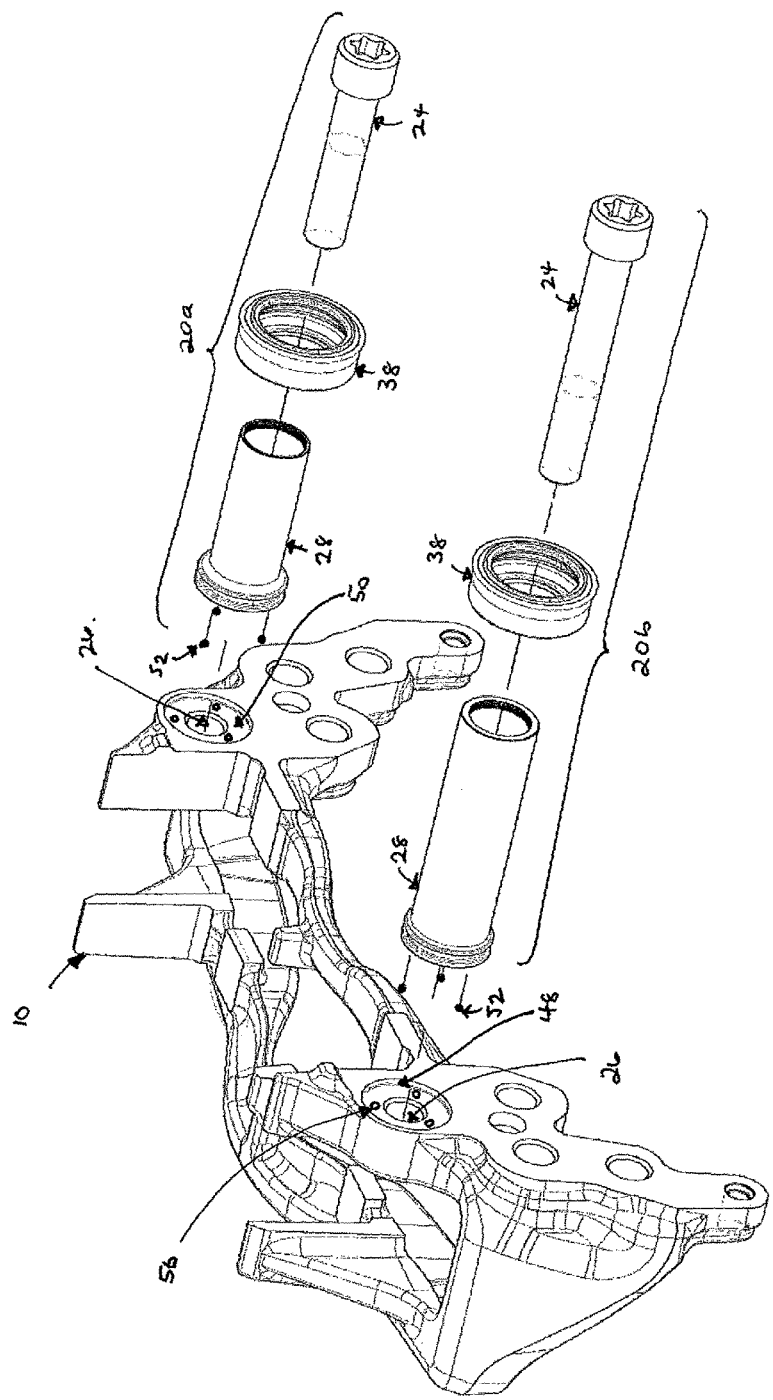
FIG. 6 is an exploded perspective view of the disk brake according to the present invention with the embodiment of the rotational fixing.
Figure 7:
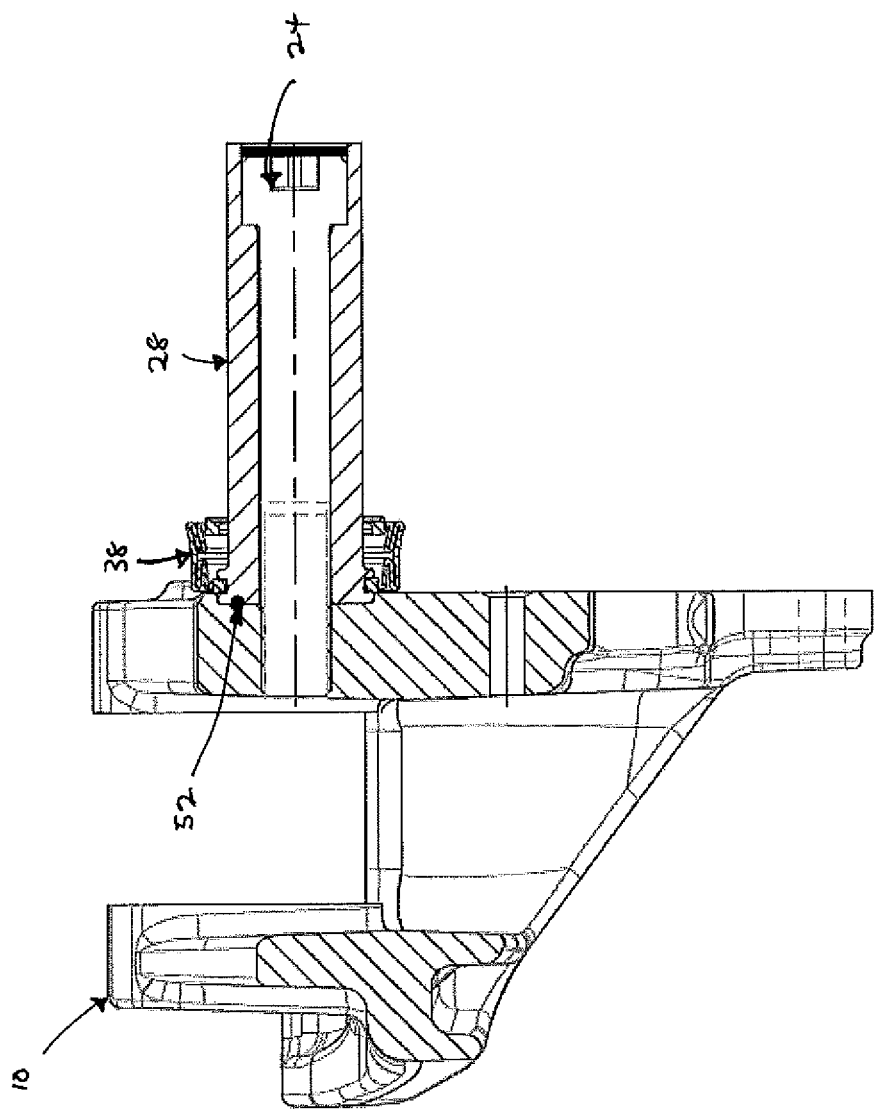
FIG. 7 is a cross-sectional view showing the guide pin mounted on the brake carrier with the embodiment of the rotational fixing.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIGS. 1 to 7 a disc brake according to the present invention is indicated generally at 1. The disc brake comprises a brake carrier 10. The brake carrier carries an inboard brake pad 12a and an outboard brake pad 12b. A rotor 14 (shown in part) is positioned between the brake pads and is rotatable about an axis R. A caliper 16 is slidably mounted with respect to the brake carrier 10 by at least one guide assembly. In the embodiment depicted, the disc brake comprises two guide assemblies 18a, 18b.

Each guide assembly comprises a guide pin 20 along which the caliper 16 can slide and a bore 22 disposed in the caliper for receiving the guide pin. In the embodiment depicted, one of the guide pins 20a is shorter than the other guide pin 20b in order to accommodate vehicle installation constraints.

The guide pin 20 comprises a fastener 24 to attach the guide pin to the brake carrier 10. The fastener is received by a complimentary bore 26 disposed in the brake carrier. In the embodiment shown in FIGS. 1 to 7, the fastener 24 for attaching the guide pin to the inboard side of the brake carrier is a threaded bolt and the bore 26 for receiving the fastener in the brake carrier is a threaded bore. When attached to the brake carrier, the guide pin extends in an axial direction A. Direction A is parallel to the axis R of rotation of the rotor and parallel to the transverse axis of the disc brake.

The guide pin 20 further comprises a guide sleeve 28 at least substantially surrounding the fastener 24 and over which the caliper 16 slides. The guide sleeve is a hollow, thin walled tube. The outer surface of the sleeve may be coated with PTFE (polytetrafluoroethylene) or any other suitable material to aid the sliding action of the caliper along the guide pin. The guide sleeve comprises a main body 30, a first end 32, a second end 34 and a bore hole 36 extending from the first end to the second end to receive the fastener. Each guide assembly comprises a sealing boot 38 to shroud the joint between the brake carrier 10 and the guide sleeve 28.

The bore 22 disposed in the caliper to receive the guide pin is an elongate hole extending from a first side (inboard) to the second side (outboard) of the caliper 16.

During use, the guide pin 20 will be subject to dynamic loads. To counter rotational torque, the disc brake of the present invention comprises a rotational fixing to rotationally engage the guide sleeve 28 and the brake carrier 10 and thereby substantially restrict undesirable rotation of the guide sleeve about its longitudinal axis.

By restricting the rotation of the guide sleeve relative to the brake carrier, the transmission of rotation from the guide sleeve to the fastener is substantially avoided. Thus, the subsequent risk of loosening the fastener from the brake carrier is advantageously averted.

To counter translational torque, the rotational fixing is also configured to translationally engage the guide sleeve 28 and the brake carrier 10 and thereby substantially restrict translation movement of the guide sleeve relative to the brake carrier. By translationally engaging the guide sleeve and the brake carrier, the rotational fixing helpfully substantially impedes undesirable lateral translational movement of the guide sleeve in the circumferential direction X and perpendicular translational movement of the guide sleeve in the tangential direction Y. Circumferential direction X is perpendicular to the axial direction A, perpendicular to the tangential direction Y, and parallel to the longitudinal axis of the disc brake. Tangential direction Y is tangential to a circle describe by the rotation of the rotor 14, perpendicular to the axial direction A, perpendicular to the longitudinal axis of the disc brake and parallel to the direction in which the brake pads 12a, 12b are inserted or removed from the brake carrier 10.

The disc brake may comprise one or more rotational fixings to engage the guide sleeve of each guide pin and brake carrier. In the embodiment depicted in FIGS. 1 to 7, the disc brake comprises three rotational fixings to restrict the movement of each guide pin. The rotational fixings are the same type.

The rotational fixing for the disc brake comprises a sleeve portion of the guide sleeve, a receiving portion of the brake carrier for receiving the sleeve portion and an inter-connection to engage the sleeve portion and receiving portion when the sleeve portion is received in the receiving portion.

The sleeve portion may comprise an end portion of the guide sleeve, a circumferential flange or rim of the guide sleeve. In the embodiment shown in FIGS. 1 to 7, the sleeve portion of the guide sleeve is a circumferential flange 40 arranged at the first end 32 of the guide sleeve. In this particular embodiment, the flange 40 has a substantially circular cross-sectional profile defined by a circular outer edge 42 and a substantially flat flange face 44.

The guide sleeve is mounted on the brake carrier when the sleeve portion is received by the receiving portion. The receiving portion of the brake carrier may comprise a receiving face against which the sleeve portion is located when the sleeve portion is received by the receiving portion. In the embodiment shown in FIGS. 1 to 7, the receiving portion comprises a recess 46 formed on the inboard side of the brake carrier into which the flange 40 of the guide sleeve can be fitted. The recess 46 has a circular inner edge 48 and a substantially flat, rear recess face 50. The circular inner edge 48 defines the cross-sectional profile of the receiving portion. The recess face 50 defines the receiving surface against which the flange face 44 abuts when it is received in the recess.

The recess face 50 is deformable. The configuration of the recess 46 compliments the configuration of the flange 40 of the guide sleeve so to help further limit translational movement of the flange when the guide pin is subjected to dynamic loads. The bore 26 for receiving the fastener is located in the recess 46. The bore 26 may be centrally located or eccentrically located in the recess. In the embodiment shown in FIGS. 1 to 7, the opening of the bore 26 is centrally arranged in the recess face 50. The recess may be manufactured with the desired cross-sectional profile using any conventional cutting, milling or machining techniques. The bore may be manufactured by any conventional drilling techniques.

The inter-connection may comprise any suitable means to inter-lock the sleeve portion and receiving portion, when the sleeve portion is received in the receiving portion, so as to inhibit movement of the guide sleeve relative to the brake carrier.

The inter-connection may comprise a connector co-locatable in a first cavity of the sleeve portion and a second cavity in the receiving potion when the sleeve portion is received in the receiving portion. The connector may have a cylinder, cuboid, sphere, ovoid, ellipsoid or any other suitably shaped body.

In the embodiment shown in FIGS. 1 to 7, each interconnection comprises a ball bearing connector 52, a first semi-circular cavity 54 formed in the flange face 44 of the flange to receive a first sector of the ball bearing and a second semi-circular cavity 56 formed in the recess face 50 to receive a second sector of the ball bearing. The ball bearing connector 52, first semi-circular cavity 54 and second semi-circular cavity 56 are configured to form interference fit/press fit connections. The first cavity 54 is pre-formed prior to assembling the rotational fixing. To enhance the interference fit/press fit connection and minimize tolerance effects, the recess face 50 is deformable and the second cavity 56 is formed during assembly of rotational fixing to receive the second sector of the ball bearing connector. When the ball bearing connector 52 is co-located in the first and second cavities, the flange and recess are inter-connected and any rotation of the guide sleeve or lateral movement between the guide sleeve and brake carrier is thereby restricted.

To mount the guide pin on the brake carrier and engage the guide sleeve and the brake carrier, the ball bearing connectors 52 are initially fitted in the first semi-circular cavities 54 of the flange such that they protrude from the flange face 44 of the flange. The flange 40 with the protruding ball bearing connectors 52 is then located in the recess 46 such that the flange face 44 with the protruding ball bearing connectors 52 abuts the recess face 50. The fastener 24 is then extended through the bore hole 26 of the guide sleeve and it is screwed into the bore 26 of the brake carrier. Under the screwing action, the ball bearing connectors 52 are pushed against the recess face 50. The recess face 50 deforms to create second cavities which receive the second sector of the ball bearing connectors. The ball bearings connectors 52 are now co-located in both the first cavities and second cavities and the co-located ball bearings 52 form a rotational and translational engagement between the flange and the recess. Sealing boots 38 are fitted to the guide sleeves 28.

When attached to the brake carrier 10, the guide pin 20 extends in an axial direction A from the brake carrier. Due to the configuration of the inter-connection and orientation of the cavities, the co-located ball bearings extend in the axial direction A between the guide sleeve and the brake carrier.

The caliper 16 will be mounted on the guide pin by locating the guide pin in the caliper bore 22 and sliding the caliper along the guide sleeve.

When fully assembled, the disc brake depicted in FIG. 1 can be actuated. An air actuator (not shown) is provided to move the inboard brake pad 12a into frictional contact with the rotor 14. When the inboard brake pad 12a is pushed towards and contacts the rotor, the caliper slides inboard along the guide pin. As the caliper slides inboard, it moves the outboard brake pad 12b towards the rotor. Hence, the rotor becomes clamped between the inboard and outboard brake pads and the rotation of the rotor is frictionally inhibited.

It is apparent that the rotational fixing not only restricts undesirable rotation but also helps to properly align the guide sleeve relative to the brake carrier during assembly. If the flange and recess are not properly aligned, the guide sleeve will not extend in the correct direction from the brake carrier and the ball bearings may not form an engagement. As a result, an operator will not be able to mount the caliper on the guide pin. Therefore, the rotational fixing usefully protects the disk brake from operator assembly error.

In an alternative embodiment, the receiving face of the receiving portion is a surface region of the inboard surface of the brake carrier. The receiving face surface region is substantially flush with the inboard surface. Hence, when the sleeve portion is received by the receiving portion, the guide sleeve is mounted directly on the in board surface of the brake carrier. The second cavities for the ball bearings are formed directly in the inboard surface of the brake carrier.

Rather than forming the second cavities by pushing the ball bearings into the receiving face of the receiving portion, the second cavities may be pre-formed to form an interference or press-fit connection with the balls bearings, when the sleeve portion is received in the receiving portion and the first cavities and second cavities are aligned. The receiving face may be deformable as the ball bearings are co-located in the pre-formed second cavities to enhance the engaging connection.

To co-locate ball bearings in a different alignment, the first cavities and second cavities may be formed in side wall portions of the flange and recess such that when the ball bearings are co-located in the cavities, the ball bearings extend in a radial direction between the sleeve portion of the guide sleeve and receiving portion of the brake carrier. The radial direction is perpendicular to the axial direction A.

As an alternative to ball bearing connectors, the inter-connection may comprises a pin connector, a first cavity disposed in the sleeve portion to receive a first end of the pin connector and a second cavity disposed in the receiving portion to receive a second end of the pin connector.

The inter-connection may additionally or alternatively comprise a protrusion integrally formed and extending from the sleeve portion or receiving portion and an indent formed in the corresponding portion to receive the protrusion. For example, the inter-connection may comprise one or more blades or teeth extending in an axial direction A from the sleeve portion into corresponding indents in the brake carrier.

The rotational fixing may further comprise a friction enhancer to enhance the frictional engagement between the sleeve portion and receiving portion and thereby further limit the rotation and/or translation of the guide sleeve with respect to the brake carrier. The friction enhancer may comprise a knurled surface formed on the sleeve portion to enhance the frictional grip of the sleeve portion with the receiving portion. The knurled surface may be arranged on an outer surface or outer edge of the sleeve portion.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A rotational fixing for a disc brake comprising:
   a brake carrier that has a receiving face and a bore extending from the receiving face;
   a guide pin that includes:
   a guide sleeve having a first end surface and a second end surface disposed at opposite distal ends of the guide sleeve, a bore hole that extends along an axis from the first end surface to the second end surface and a flange that extends continuously around the bore hole, extends radially outward with respect to the axis, and has a flange face, wherein the flange face defines the first end surface and is received by the receiving face; and a fastener that is received in the bore of the brake carrier and the bore hole of the guide sleeve such that the fastener and the guide sleeve do not slide along the axis with respect to each other when the fastener is secured to the brake carrier; and an inter-connection that engages the flange and the receiving face so as to restrict rotation of the guide sleeve about the axis relative to the brake carrier.

2. The rotational fixing of claim 1 wherein the inter-connection restricts translation of the guide sleeve relative to the brake carrier when the guide sleeve is received by the receiving face.

3. The rotational fixing of claim 1 wherein a first cavity is formed in the flange face and a second cavity is formed in the receiving face and the inter-connection is a connector that is locatable in the first cavity and the second cavity.

4. The rotational fixing of claim 1 wherein the receiving face is a surface region of an inboard surface of the brake carrier, and the receiving face is substantially flush with the inboard surface.

5. The rotation fixing of claim 1 further comprising a recess formed in the brake carrier in which the guide sleeve is received so as to restrict translation of the guide sleeve relative to the brake carrier, wherein the receiving face is disposed on a bottom of the recess.

6. The rotational fixing of claim 5 wherein the flange has an outer edge and the recess is partially defined by an inner edge that extends from the receiving face.

7. The rotational fixing of claim 5 wherein the guide sleeve further comprises a second flange that is spaced apart from the flange, the first end surface, and the second end surface, wherein the second flange is not received in the recess.

8. The rotational fixing of claim 7 wherein a sealing boot is received in a groove disposed between the flange and the second flange.

9. The rotational fixing of claim 1 wherein the receiving face is deformable and a second cavity is formed in the receiving face when the inter-connection is pushed into the receiving face.

10. The rotational fixing of claim 1 wherein the inter-connection is a protrusion that extends from the flange.

11. The rotational fixing of claim 1 wherein the inter-connection is a protrusion that extends from the receiving face.

12. The rotational fixing of claim 3 wherein the connector is a ball bearing.

13. The rotational fixing of claim 12 wherein the first cavity further comprises a semi-circular cavity that receives a first sector of the ball bearing and the second cavity further comprises a semi-circular cavity that receives a second sector of the ball bearing.

14. The rotational fixing of claim 3 wherein the connector is a pin.

15. The rotational fixing of claim 14 wherein the first cavity receives a first end of the pin and the second cavity receives a second end of the pin.

16. A disc brake comprising:
a brake carrier having a bore and a receiving face;
a caliper;
a guide pin that includes:

a guide sleeve having a first end surface and a second end surface disposed at opposite distal ends of the guide sleeve, a bore hole that extends along an axis from the first end surface to the second end surface, and a flange that extends continuously around the bore hole, extends radially outward with respect to the axis, and has a flange face, wherein the flange face defines the first end surface and engages the receiving face; and a fastener that is received in the bore of the brake carrier and the bore hole of the guide sleeve such that the fastener and the guide sleeve do not slide along the axis with respect to each other when the fastener is secured to the brake carrier; and an inter-connection that engages the flange and the receiving face so as to restrict rotation of the guide sleeve relative to the brake carrier thereby inhibiting the guide sleeve from rotating the fastener about the axis and loosening the fastener from the brake carrier.

17. A method for fixing a guide pin of a disc brake comprising:
providing a guide sleeve having a bore hole that extends along an axis and extends from a first end surface of the guide sleeve to a second end surface of the guide sleeve, the first and second end surfaces being disposed at opposite distal ends of the guide sleeve, and a flange that extends continuously around the bore hole, extends radially outward with respect to the axis, and has a flange face, wherein the flange face defines the first end surface;
providing a brake carrier having a bore and a recess that has a recess face;
providing a connector;
providing a fastener; and
assembling the guide sleeve, connector, fastener, and brake carrier such that the fastener is positioned in the bore and the bore hole such that the fastener and the guide sleeve do not slide along the axis with respect to each other, and the connector extends between the flange face and the recess face and restricts rotation of the guide sleeve relative to the brake carrier when the flange face is disposed against the recess face.

18. The method of claim 17 wherein the connector restricts translation of the guide sleeve relative to the brake carrier.

19. The method of claim 17 wherein a first cavity is pre-formed in the flange face, a second cavity is pre-formed in the recess face, and assembling includes:
locating a first part of the connector in the first cavity;
positioning the guide sleeve with the connector located in the first cavity in the recess; and
aligning the first cavity and the second cavity to locate a second part of the connector in the second cavity.

20. The method of claim 17 wherein a first cavity is pre-formed in the flange face and the recess face is deformable, and when the recess face is deformable assembling includes:
locating a first part of the connector in the first cavity;
positioning the guide sleeve with the connector located in the first cavity in the recess; and
pushing the connector against the recess face to form a second cavity in the recess face in which a second part of the connector is located.

* * * * *